No. 677,417. Patented July 2, 1901.
H. F. KNIGHT.
CLUTCH MECHANISM.
(Application filed Nov. 22, 1900.)
(No Model.) 3 Sheets—Sheet 1.

Witnesses.
John E. Bousfield.
C. G. Redfern

Inventor.
H. F. Knight

No. 677,417. Patented July 2, 1901.
H. F. KNIGHT.
CLUTCH MECHANISM.
(Application filed Nov. 22, 1900.)
(No Model.) 3 Sheets—Sheet 2.

Witnesses
John E. Bousfield
C. G. Redfern

Inventor
H. F. Knight

THE NORRIS PETERS CO., PHOTO-LITHO., WASHINGTON, D. C.

No. 677,417. Patented July 2, 1901.
H. F. KNIGHT.
CLUTCH MECHANISM.
(Application filed Nov. 22, 1900.)
(No Model.) 3 Sheets—Sheet 3.
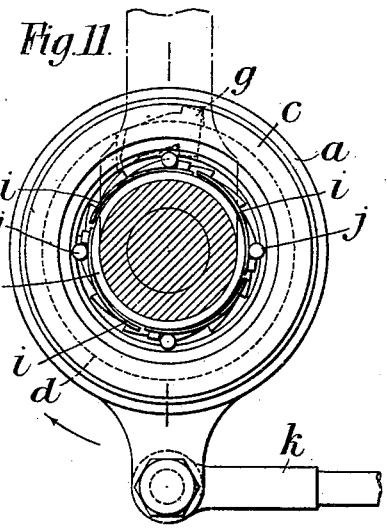
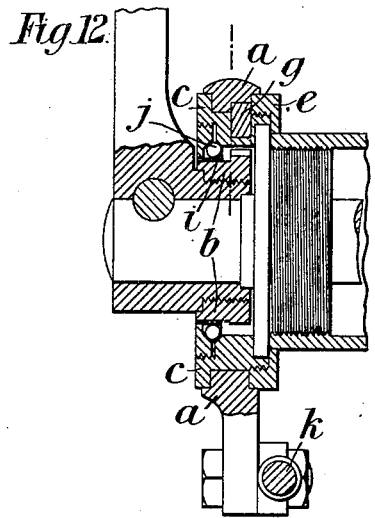
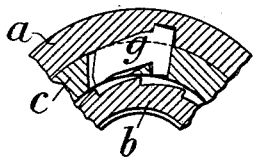
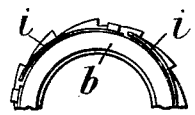
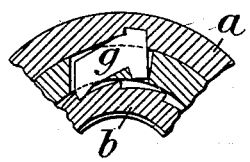
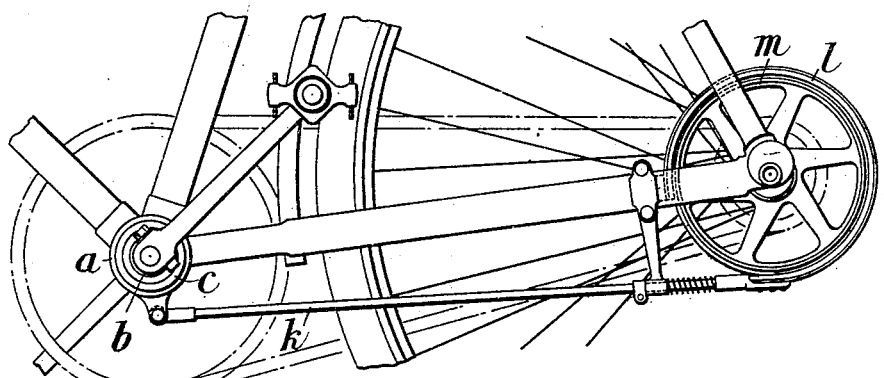
Witnesses
John E. Dousfield.
C. J. Redfern
Inventor:
H. F. Knight

UNITED STATES PATENT OFFICE.

HOWARD FORESTER KNIGHT, OF CROYDON, ENGLAND.

CLUTCH MECHANISM.

SPECIFICATION forming part of Letters Patent No. 677,417, dated July 2, 1901.

Application filed November 22, 1900. Serial No. 37,325. (No model.)

*To all whom it may concern:*

Be it known that I, HOWARD FORESTER KNIGHT, a subject of the Queen of Great Britain, residing at 2 Morland Road, Croydon, county of Surrey, England, have invented new and useful Improvements in Clutch Mechanism, of which the following is a specification.

My invention relates to improved means for connecting and disconnecting two concentric rings arranged one upon the other and capable of partaking of rotary motion independently of each other, the object of my invention being to provide mechanism in which the noise and friction incidental to the use of a pawl or pawls upon one ring and engaging upon ratchet-teeth upon the other ring are avoided.

According to my invention I arrange in connection with the inner and outer rings an intermediate ring, the motion of which relatively with the outer ring serves to operate the pawl or pawls to cause its or their engagement with or disengagement from the ratchet-teeth on the inner ring. This intermediate ring has in combination with it a series of balls or rollers so disposed that under certain conditions they will cause a slight relative movement between the intermediate ring and the outer ring for the purpose of operating the pawl or pawls.

Figure 1:
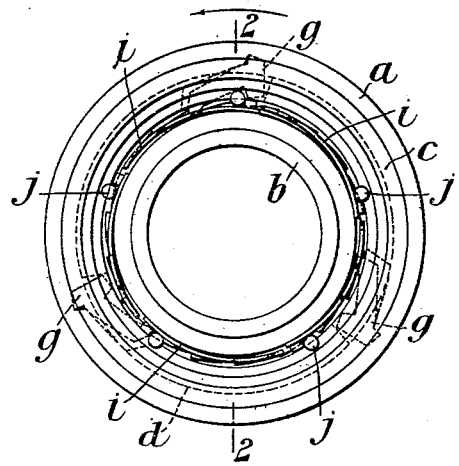
Figure 2:
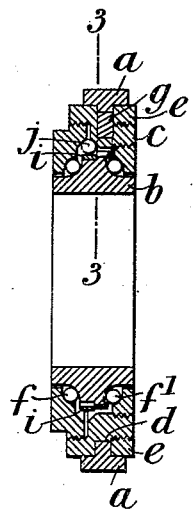
Figure 5:
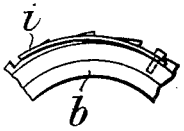
Figure 3:
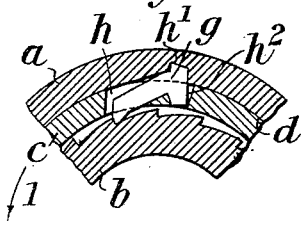
Figure 4:
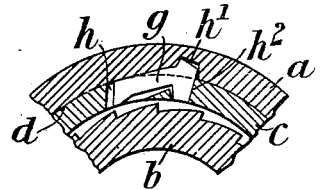
Figure 6:
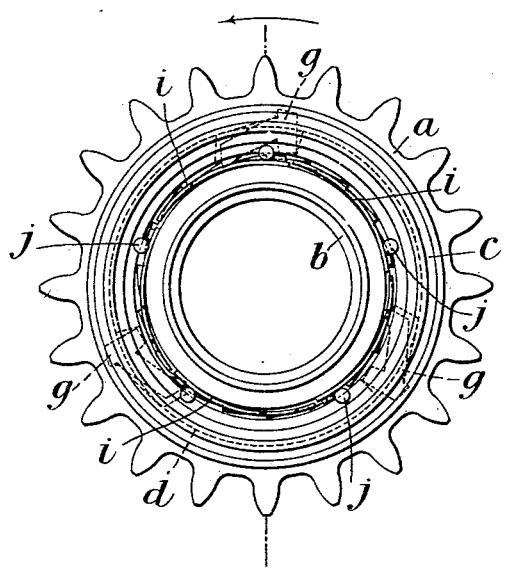
Figure 7:
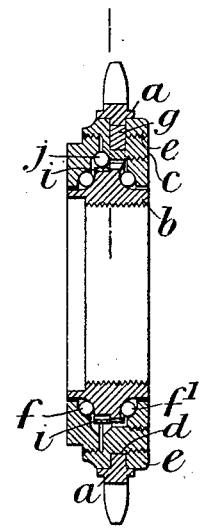
Figure 10:
Figure 8:
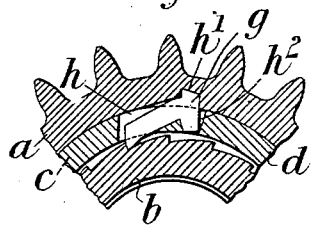
Figure 9:
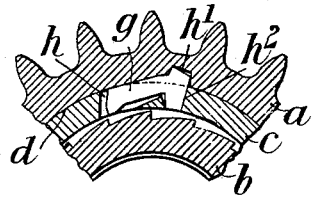

In the accompanying drawings, Figure 1 is a side elevation of my improved clutch mechanism, a cover or inclosing ring being removed in order to reveal the parts beneath it. Fig. 2 is a section on the line 2 2, Fig. 1. Fig. 3 is a section on the line 3 3, Fig. 2, showing the position of the pawl when the inner and outer rings are locked; and Fig. 4 is a view similar to Fig. 3, but showing the position of the parts when the pawl is out or engagement with the inner ring. Fig. 5 is an elevation of a portion of the inner ring. Figs. 6 to 10 are views similar to Figs. 1 to 5, respectively showing my invention as arranged for use in connection with free-wheel-driving mechanism for a cycle; and Figs. 11 to 15 are similar views showing the application of the mechanism for applying a brake. Fig. 16 is a side elevation showing the general arrangement of the apparatus in connection with a cycle-brake.

Similar letters of reference indicate corresponding parts in the several figures.

$a$ is the outer ring, $b$ the inner ring, and $c$ the intermediate ring, the said outer ring, as shown, being slipped onto a suitable bearing-surface $d$ on the intermediate ring and being held thereon by a ring $e$, while the intermediate ring runs on the inner ring by means of two series of antifriction-balls $f\ f'$.

$g\ g$ are the pawls by means of which connection between the outer and inner rings is effected. The said pawls may be of any suitable construction. As shown, however, each of them is located in a recess $h$ in the intermediate ring $c$, (see Fig. 3,) lugs or projections upon each of the said pawls engaging, respectively, with a recess $h'$ in the ring $a$ and with another recess $h^2$ upon the ring $c$, whereby it will be readily understood that, assuming the pawl to be in the position shown in Fig. 3, a movement of the ring $c$ relatively with the ring $a$ in the direction indicated by the arrow 1 in the said figure will cause the pawl to disengage from the teeth of the ring $b$, and vice versa. In practice this relative movement for disengaging the pawl would be caused by the inner ring $b$ running faster than the intermediate ring $c$, the teeth of the ratchet simply acting upon the pawl and moving the intermediate ring. The reëngagement of the pawl is caused by the movement of the intermediate ring $c$ relatively with the ring $a$ in a direction contrary to that indicated by the arrow 1, Fig. 3, and is accomplished, for instance, by producing more friction between the rings $b$ and $c$ than exists between the rings $c$ and $a$. For this purpose I provide upon the inner ring $b$ a series of springs $i\ i$, the surfaces of which are not quite concentric with the periphery of the said ring, and in arranging in connection with these springs balls $j\ j$, which when the ring $a$, and with it the ring $c$, is moved faster than the ring $b$ tends to cause the said balls $j\ j$ to run along the surfaces of the springs $i\ i$ and produce an amount of friction between the rings $b$ and $c$ which is greater than the amount of friction between the rings $c$ and $a$, and the accelerated motion of the ring $a$ causes the movement of the pawls to engage with the teeth on the ring $b$.

This clutch mechanism may with advantage be used in connection with free-wheel mechanism for cycles or with brake mechanism. In its application for the former purpose, which is illustrated in Figs. 6 to 10, the inner ring $b$ is advantageously fixed upon the rear-wheel hub, and the ring $a$ carries the sprocket-teeth for the driving-chain. With this arrangement it will be understood that when—for instance, in going downhill—the rider ceases to operate the pedals the inner ring $b$ by continuing to run while the ring $a$ remains at rest forces the pawls $g\ g$ out of engagement with the teeth upon the said ring $b$, so that the machine continues to run without the pawls bearing upon these teeth. When, however, the rider desires to again impart motion to the back wheel, the treadles must be moved forward sufficiently fast to cause the outer ring $a$ to move faster than the inner ring $b$, so as by means of the springs $i$ and balls $j$ to set up sufficient friction between the rings $b$ and $c$ to retard the motion of the latter slightly relatively with the ring $a$, whereby the pawls would be caused to engage with the ring $b$.

When my mechanism is to be used for applying a brake to the back wheel of a cycle—as shown, for instance, in Figs. 11 to 16—the ring $a$ is connected by a rod $k$ to one end of a band-brake $l$, passing around a wheel or drum $m$ on the hub and attached at its other end to the framing of the machine. In this arrangement the inner ring $b$ is fixed to the pedal-axle and rotates therewith, while the rings $a$ and $c$ remain stationary. So long as the ring $b$ is rotating, the pawls $g$, only one of which is shown, are out of engagement with the teeth on the said ring. When, however, the pedal-axle is stopped and rotated slightly in the reverse direction, the springs $i$ act upon the balls $j$ and set up sufficient friction between the rings $b$ and $c$ to move the latter relatively with the ring $a$, with the result that the pawl is caused to engage with the teeth on the ring $b$, the further movement of which in the direction of back-pedaling causes the ring $a$ to turn in the direction of the arrow, Fig. 11, and move the rod $k$ to apply the brake band or strap.

Having now particularly described and ascertained the nature of my said invention and in what manner the same is to be performed, I declare that what I claim is—

1. The improved clutch mechanism comprising an outer ring, an inner ring and an intermediate ring, a pawl or pawls arranged in connection with recesses in the said rings in such a manner that any relative movement of the said rings causes the movement of the said pawl or pawls, ratchet-teeth on the inner ring with which the pawl or pawls is or are designed to engage and means for momentarily setting up a friction between the inner and the intermediate rings greater than that which exists between the intermediate and the outer ring, substantially as described.

2. In clutch mechanism, the combination of an inner ring having ratchet-teeth on its periphery, an intermediate ring rotating upon the said inner ring, an outer ring carried by the intermediate ring, a pawl or pawls carried in recesses in the said outer and intermediate rings and designed to engage with the teeth on the inner ring, springs on the inner ring the surfaces of which are eccentric to the surface of the said inner ring and balls arranged between the inner ring and the intermediate ring and designed to produce friction between the inner and intermediate rings greater than that which exists between the intermediate and outer rings, substantially as described.

HOWARD FORESTER KNIGHT.

Witnesses:
JOHN E. BOUSFIELD,
C. G. REDFERN.